US008035748B2

(12) United States Patent
Wyman et al.

(10) Patent No.: US 8,035,748 B2
(45) Date of Patent: Oct. 11, 2011

(54) METHOD AND SYSTEM FOR REDUCING COMPOSITE VIDEO CROSS-CHROMA ARTIFACTS IN MOVIE MATERIAL FOR A DEINTERLACER

(75) Inventors: Richard Hayden Wyman, Sunnyvale, CA (US); Brad A. Delanghe, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 1460 days.

(21) Appl. No.: 11/485,094

(22) Filed: Jul. 12, 2006

(65) Prior Publication Data

US 2008/0012984 A1 Jan. 17, 2008

(51) Int. Cl.
*H04N 11/00* (2006.01)
(52) U.S. Cl. ........................................................ 348/609
(58) Field of Classification Search .................. 348/448, 348/441, 449, 620, 624, 701, 451–452, 699; 375/240.2, 240.12; 703/6, 5
See application file for complete search history.

(56) References Cited

U.S. PATENT DOCUMENTS

| | | | | |
|---|---|---|---|---|
| 5,027,194 A * | 6/1991 | Scheffler | ........................ | 348/609 |
| 6,704,055 B1 * | 3/2004 | He et al. | ........................ | 348/449 |
| 7,202,907 B2 * | 4/2007 | Chow | ........................ | 348/441 |
| 7,327,398 B2 * | 2/2008 | Hall | ........................ | 348/448 |
| 7,397,515 B2 * | 7/2008 | Walls et al. | ........................ | 348/624 |
| 7,466,361 B2 * | 12/2008 | Wyman | ........................ | 348/452 |
| 7,551,232 B2 * | 6/2009 | Winger et al. | ........................ | 348/607 |
| 7,557,861 B2 * | 7/2009 | Wyman | ........................ | 348/441 |
| 7,586,540 B2 * | 9/2009 | Ogino et al. | ........................ | 348/448 |
| 7,630,870 B2 * | 12/2009 | Chen et al. | ........................ | 703/6 |
| 2005/0018087 A1 * | 1/2005 | Lee | ........................ | 348/700 |
| 2006/0244868 A1 * | 11/2006 | Jia et al. | ........................ | 348/701 |

* cited by examiner

*Primary Examiner* — Paulos M Natnael
(74) *Attorney, Agent, or Firm* — McAndrews, Held & Malloy, Ltd.

(57) ABSTRACT

Herein described is a method and system for generating an improved video output when deinterlacing pull-down video. The improvement results from reducing cross-chroma artifacts. In a representative embodiment, the method comprises first computing an adjusted chroma of a present pixel from a present top field or present bottom field of film sourced video as a function of an execution stage field phase. The method further comprises second computing a chroma of an absent pixel vertically adjacent to the present pixel, wherein the second computing is performed as a function of the execution stage field phase. In a representative embodiment, a deinterlacer video engine and a local storage circuitry process the 3:2 pull-down video by applying various equations for performing the first computing and the second computing. An adjusted chroma and an absent pixel chroma is computed for each present pixel at each execution stage field phase.

23 Claims, 4 Drawing Sheets

METHOD AND SYSTEM FOR REDUCING COMPOSITE VIDEO CROSS-CHROMA ARTIFACTS IN MOVIE MATERIAL FOR A DEINTERLACER

CROSS-REFERENCE TO RELATED APPLICATIONS/INCORPORATION BY REFERENCE

This application makes reference to U.S. patent application Ser. No. 10/871,758 entitled "DETECTION AND PHASE LOCK OF PULL-DOWN VIDEO" filed on Jun. 17, 2004, the complete subject matter of which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

When an analog video decoder decodes a composite video signal, the decoder may be unable to successfully determine whether the signal is luma or chroma. If the video decoder interprets the signal as chroma when in fact it was luma, an artifact known as cross-chroma results. Cross-chroma results in characteristic rainbow patterns on the screen. Given the alternating phase of a chroma subcarrier between subsequent fields, localized features on the screen can result in alternating and opposite cross-chroma colors.

If the source material is a movie, often 3:2 pulldown has been performed. If this is detected, it is known between which fields motion is possible. Between fields where it is known that no motion is possible, filtering may be used to cancel out the alternating opposite cross-chroma. However, cross-chroma may still be present.

The limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention provide at least a system and a method for reducing cross-chroma artifacts when deinterlacing pull-down video as substantially shown in and/or described in connection with at least one of the following figures, as set forth more completely in the claims.

These and other advantages, aspects, and novel features of the present invention, as well as details of illustrated embodiments, thereof, will be more fully understood from the following description and drawings.

DETAILED DESCRIPTION OF THE INVENTION

Various aspects of the invention provide at least a system and method of reducing cross-chroma artifacts when displaying movie material using a decoder or deinterlacer. The aspects of the invention may be applied to deinterlacers (or decoders) used in NTSC 3:2 pull-down video or PAL 2:2 pull-down video, for example. Cross chroma is a video artifact that occurs when a composite video decoder or deinterlacer (i.e., including a comb filter) incorrectly interprets luma information (luminance) to be chroma information (chrominance).

Figure 1:
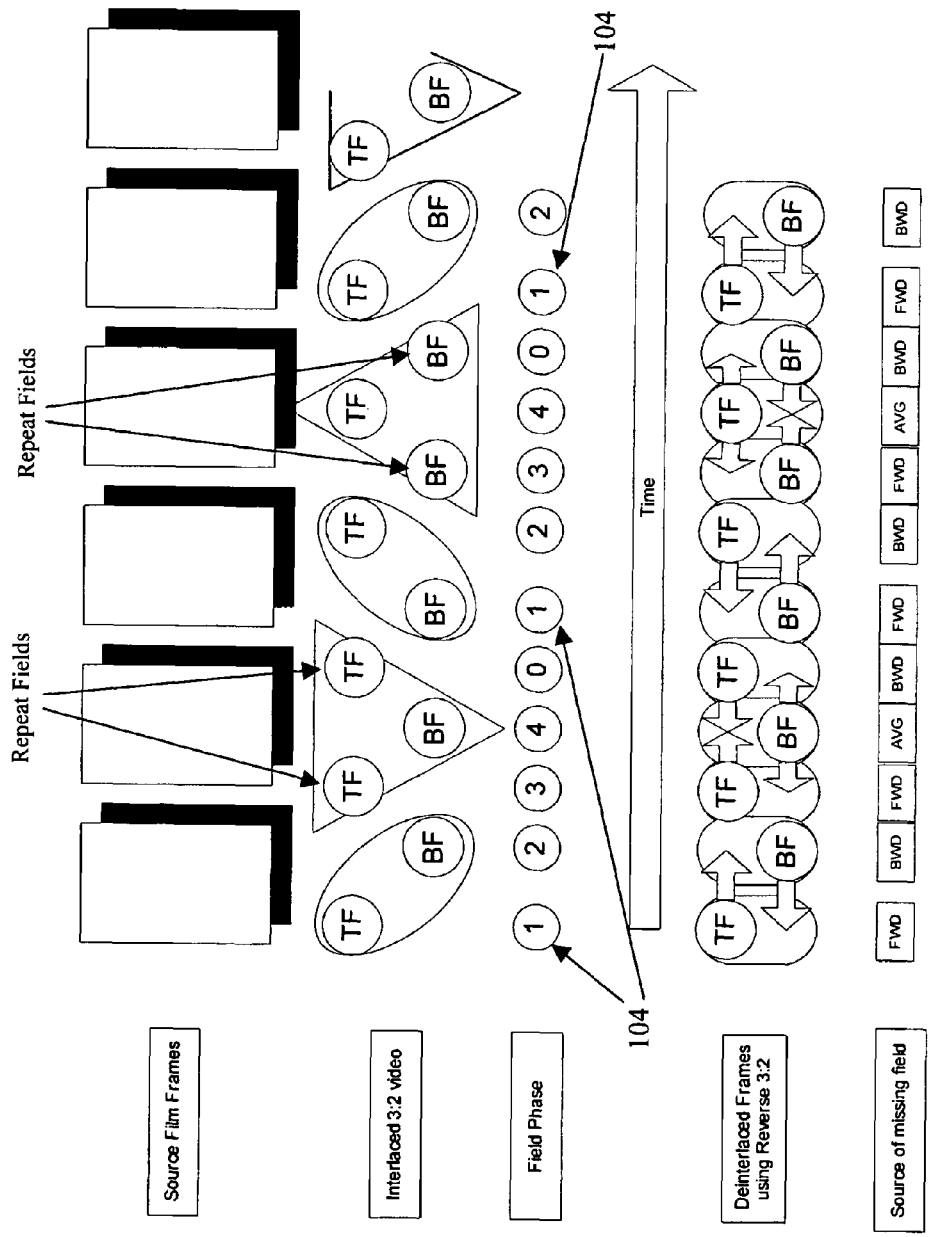
FIG. 1 is a block diagram illustrating the operation of performing reverse 3:2 pull-down when an interlaced 3:2 pull-down video is received by a deinterlacer, in accordance with an embodiment of the invention.

FIG. 1 is a block diagram illustrating the operation of performing reverse 3:2 pull-down when an interlaced 3:2 pull-down video is received by a deinterlacer, in accordance with an embodiment of the invention. One or more source film frames are shown in the top portion of FIG. 1. Two source film frames captured at a rate of 24 frames per second are used to generate 5 fields of video at a rate of 60 fields per second. Thus, the interlaced 3:2 pull-down video comprises a sequence of top and bottom fields (labeled TF and BF) running at 60 fields per second. As shown, the first source film frame is represented by two fields while the second source film frame is represented by three fields. Since the interlaced video has a periodicity of 5 fields, the field phase may be determined using a modulo 5 counter. Subsequently, the interlaced video is de-interlaced using reverse 3:2 pull-down as illustrated in the fourth row of FIG. 1. The directional arrows provide an indication of what source film frame is to be used to generate the missing field in order to display de-interlaced progressive video at double the display rate. The last row of FIG. 1 illustrates the source of the missing field or direction of the weave (either forwards, backwards, or both) utilized in order to correctly generate the source film frame used when displaying de-interlaced progressive video. In reverse 3:2 pull-down operation, the location of the pull-down field within the video stream is determined. As a consequence of determining the temporal location of the pull-down field, the field phase (e.g., an execution stage field phase) may be easily extrapolated by way of the known 3:2 video cadence, as illustrated in FIG. 1. In this representative embodiment, the pull-down field is defined as field phase 0. The pull-down field may be defined as the repeated field of the three fields that are sourced from the same source film frame. Of the three fields that are sourced from a single source film frame, two fields are identical. The two identical fields may comprise two top fields or two bottom fields, as indicated in FIG. 1. As may be seen in FIG. 1, the field phase may be computed by applying the modulo 5 operator to the field count. For example, field phase #1 may be identified at three locations 104 in FIG. 1.

Figure 2:
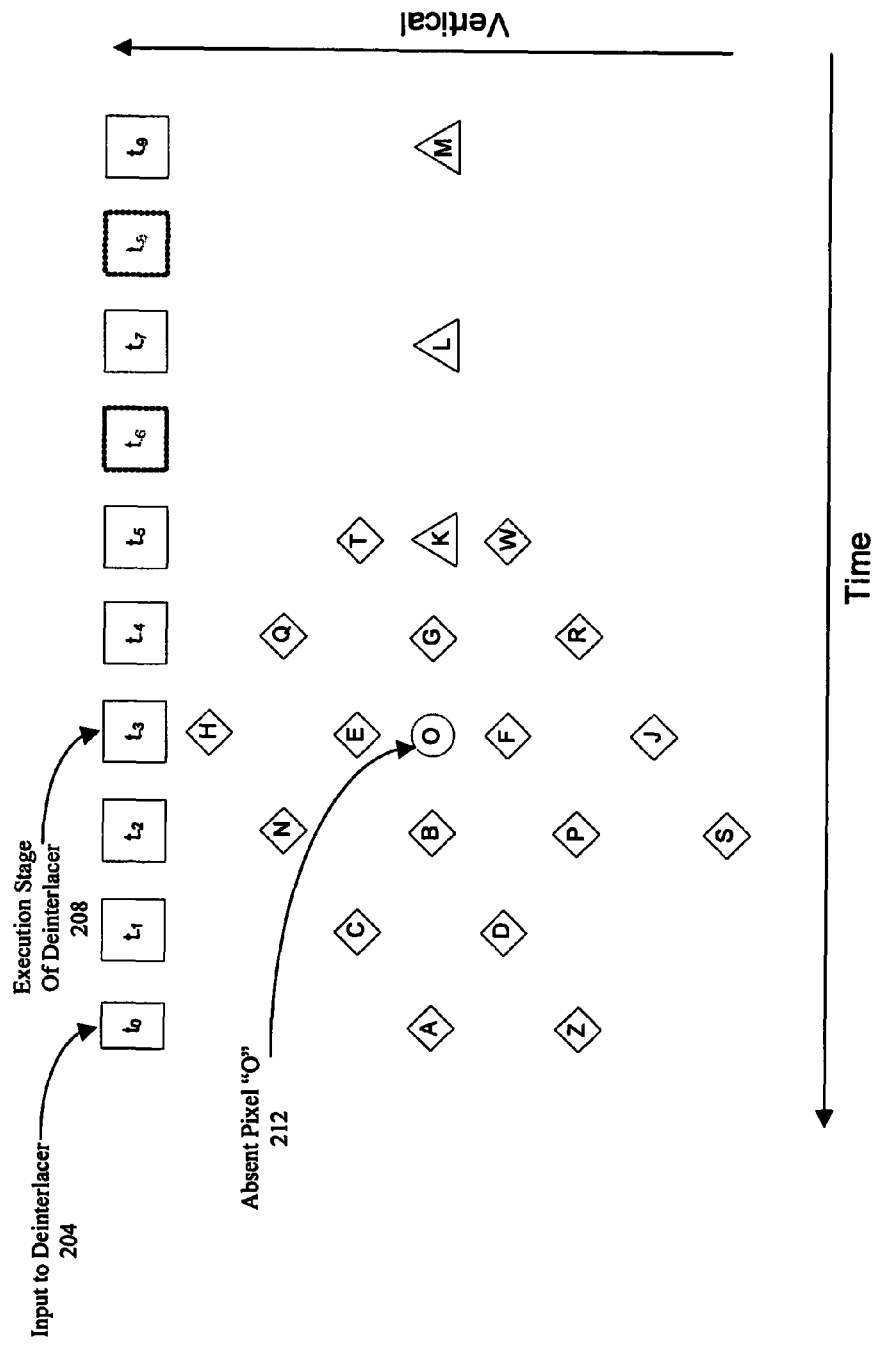
FIG. 2 illustrates an exemplary pixel constellation that is used in performing reverse 3:2 pull-down and deinterlacing of pull-down video, in accordance with an embodiment of the invention.

FIG. 2 illustrates an exemplary pixel constellation that is used in performing reverse 3:2 pull-down and deinterlacing of pull-down video, in accordance with an embodiment of the invention. In this representative embodiment, the extended pixel constellation corresponds to time $t=t_3$ and is centered around absent pixel "O" 212, as shown in FIG. 2. Absent pixel "O" corresponds to a particular vertical position along the ordinate axis, as shown. The time corresponding to $t=t_3$ is associated with the execution stage of the deinterlacer. The pixel constellation provides an exemplary set of pixel locations, used in the reverse 3:2 pull-down process, for computing or approximating a pixel chroma at a desired location. In reference to FIG. 2, the abscissa is represented by way of discrete temporal indicators $t_0$, $t_1$, $t_2$, $t_3$, etc. In reference to the lower portion of FIG. 2, the lettered elements correspond to the extended pixel constellation. The extended pixel constellation varies temporally along the abscissa and spatially along the ordinate. The extended pixel constellation may be construed to represent present pixel locations corresponding to a top or bottom field. The extended pixel constellation is mapped as a function of vertical pixel location and time. Referring to FIG. 2, the deinterlacer, receives an input at time $t_0$ 204 and generates outputs at time $t_3$ 208. The deinterlacer may generate outputs during an "execution phase". FIG. 2 provides an exemplary pixel constellation when a deinterlacer inputs interlaced 3:2 pull-down video at time $t_0$ 204 and outputs progressive frames at time $t_3$ 208.

As may be referenced in U.S. patent application Ser. No. 10/871,758 entitled "DETECTION AND PHASE LOCK OF PULL-DOWN VIDEO" filed on Jun. 17, 2004, the field phase or execution stage field phase, as described in reference to FIG. 1, may be determined so that a reverse 3:2 pull-down may be performed. A phase lock detector (PLD) determines whether the received video is, in fact, interlaced 3:2 video by analyzing the correlation characteristics of one or more pixel pairs. As previously illustrated in FIG. 1, for interlaced 3:2 (pull-down) video, a repeated field is contained within three fields corresponding to a particular source film frame (as represented by triangular areas of the second row of FIG. 1). The three fields originate from the same source film frame. Further, the repeated field occurs exactly 2 field phase periods afterwards.

Again referring to the extended pixel constellation provided by FIG. 2, the spatial location that defines an absent pixel, in which an absent pixel chroma is to be determined at time $t=t_{-3}$, is defined as pixel O. The location of pixel O may be considered spatially vertically adjacent to present pixel locations E and F, for example. Other absent pixels are not marked in the extended pixel constellation; however, the spatial locations of these absent pixels are equidistant between vertically adjacent present pixels (or pixel locations). For example, an absent pixel may be located in-between present pixel locations N and B, or in-between present pixel locations Q and G. In this representative embodiment, the extended pixel constellation of FIG. 2 provides the location of pixels, in a top or bottom field, at various times (i.e., at various field phases relative to the execution stage), which may be used to compute the absent pixel chroma, spatially located at pixel O. The extended pixel constellation may also be used to compute an adjusted present pixel chroma. Various aspects of the present invention provide for computing the chroma for pixel O by using chroma from one or more present pixels from a present top field or present bottom field. The present top field or present bottom field originates from a particular top field or bottom field (of the interlaced 3:2 video) that is associated with the execution stage field phase or current output phase at $t=t_{-3}$. These top and bottom fields originate from one or more source film frames to generate interlaced 3:2 (pull-down) video shown in FIG. 2. The term "present pixel" is intended to refer to one or more pixels in a present top field or present bottom field defined at $t=t_{-3}$ for the representative embodiment of FIG. 2. The term present top field refers to a top field that is currently being processed at the output of a deinterlacer or decoder at time $t=t_{-3}$. The output field phase of the deinterlacer is defined at $t=t_{-3}$, as shown in FIG. 2. Likewise, the term "present bottom field" refer to a bottom field that is currently being processed at the output of the deinterlacer or decoder at time $t=t_{-3}$. For example, at time $t_{-3}$, the chroma for pixels H, E, F, and J may be used from a present top field or present bottom field, in the computation of an adjusted chroma for a present pixel, or an absent pixel chroma. Although not included in the illustration of FIG. 2, a horizontal spatial dimension may be represented by each of the pixels H, E, F, and J. Each of H, E, F, and J may be used to represent a horizontal scan line of a present top or bottom field, for example. Chroma of pixels from top or bottom fields occurring at times other than $t_{-3}$, may be represented by pixels A, B, C, D, G, K, L, M, N, P, Q, R, S, T, W, Z, as shown in FIG. 2. The pixel constellation (i.e., A, B, C, D, E, F, G, H, J, K, L, M, N, P, Q, R, S, T, W, Z) provides the vertical spatial location of one or more available pixels from either a top field or bottom field originated source film field. In the representative embodiment of FIG. 2, chroma values from one or more available pixels in a top field or a bottom field may be obtained from pixel locations A, B, C, D, E, F, G, H, J, K, L, M, N, P, Q, R, S, T, W, Z. Any one or more of these pixels represent chroma that may be used in the computation of a more accurate (or adjusted) chroma value for a particular present pixel and for an absent pixel. As defined in accordance with the various aspects of the present invention, the term "vertically adjacent" refers to pixels that are adjacent to particular present or absent pixel at a particular time (i.e., at a particular field phase period). For example, there are two present pixels, E and F, which are vertically adjacent to the absent pixel O. In other words, referring to the absent pixel defined at position O, as illustrated in FIG. 2, the two vertically adjacent present pixels relative to pixel O are defined at locations E and F. Relative to an absent pixel located at a spatial location corresponding to pixel E that occurs at time $t=t_{-2}$, the corresponding two vertically adjacent pixels are located at N and B. Likewise, relative to an absent pixel located at a spatial location corresponding to pixel F that occurs at time $t=t_{-2}$, the two vertically adjacent pixels are located at B and P. Relative to an absent pixel located at spatial location corresponding to pixel E that occurs at time $t=t_{-4}$, the two vertically adjacent pixels are located at Q and G. Likewise, G and R correspond to vertically adjacent pixels relative to an absent pixel located at a spatial location corresponding to pixel F at time $t=t_{-4}$.

In a preferred representative embodiment, the following equations shown in Tables 1 and 2 may be used to compute adjusted chroma values for each present pixel in either a top field or bottom field of interlaced 3:2 (pull-down) video. The equations may be used to provide a more accurate computation of present pixel chroma and absent pixel chroma. The computations may be used to eliminate or minimize cross-chroma artifacts that are typically generated during deinterlacing of video using reverse 3:2 pull-down.

TABLE 1

| Execution stage field phase | Present pixel chroma TOP FIELD | Present pixel chroma BOTTOM FIELD |
|---|---|---|
| 0 | ½E + ½T | ½F + ½W |
| 1 | ½E + ¼N + ¼B | ½F + ¼B + ¼P |
| 2 | ½E + ¼Q + ¼G | ½F + ¼G + ¼R |
| 3 | ½E + ½C | ½F + ½D |
| 4 | ¼N + ¼B + ¼Q + ¼G | ¼B + ¼P + ¼G + ¼R |

TABLE 2

| Execution stage field phase | Absent pixel chroma |
| --- | --- |
| 0 | ¼E + ¼T + ¼F + ¼W |
| 1 | ½B + ¼E + ¼F |
| 2 | ½G + ¼E + ¼F |
| 3 | ¼C + ¼E + ¼D + ¼F |
| 4 | ½B + ½G |

Each equation is used to compute an adjusted chroma that provides reduced cross-chroma artifacts when a video, such as a movie, is displayed. Each equation is defined in terms of the chroma associated with one or more available pixels, as defined by the pixel constellation (A, B, C, D, E, F, G, H, J, K, L, M, N, P, Q, R, S, T, W, Z) shown in FIG. 2. The present pixel for a top field is defined to be at the spatial location defined by E while the present pixel for a bottom field is defined to be at the spatial location defined by F. The absent pixel is defined to be at the spatial location "O" as shown in FIG. 2.

For execution stage field phase 0, the adjusted chroma from a present pixel for a corresponding present top field may be computed by way of solving the equation:

$$\frac{1}{2}E + \frac{1}{2}T,$$

obtained from Table 1. As shown, the adjusted chroma is computed by taking the average of the chroma obtained from pixels E and T of the extended constellation shown in FIG. 2. For the bottom field, at execution stage field phase 0, the adjusted chroma may be computed by way of solving the equation:

$$\frac{1}{2}F + \frac{1}{2}W,$$

obtained from Table 1. As shown, the adjusted chroma is computed by taking the average of the chroma obtained from pixels F and W of the extended constellation shown in FIG. 2. For execution stage field phase 0, the absent pixel chroma may be computed by way of the following equation:

$$\frac{1}{4}E + \frac{1}{4}T + \frac{1}{4}F + \frac{1}{4}W,$$

as obtained from Table 2. Hence, one obtains the chroma for the absent pixel by taking the average of the chroma associated with pixels at spatial locations E, T, F, and W.

For execution stage field phase 1, the adjusted chroma from a present pixel from a corresponding present top field may be computed by way of solving the equation:

$$\frac{1}{2}E + \frac{1}{4}N + \frac{1}{4}B,$$

obtained from Table 1. The adjusted chroma is computed by summing one-half of the chroma of a pixel represented by spatial location E, one-quarter of the chroma of a pixel represented by spatial location N, and one-quarter of the chroma of a pixel represented by spatial location B. The present pixel represented by spatial location E (i.e., present pixel E) originates from a present top field while the pixels at locations N and B originate from a bottom field one field phase later than the present top field. The pixels at N and B are spatially vertically adjacent to an absent pixel that corresponds to present pixel E. Likewise, for execution stage field phase 1, the adjusted chroma from a present pixel from a corresponding present bottom field may be computed by way of solving the equation:

$$\frac{1}{2}F + \frac{1}{4}B + \frac{1}{4}P.$$

The adjusted chroma is computed by summing one-half of the chroma of a pixel represented by spatial location F, one-quarter of the chroma of a pixel represented by spatial location B, and one-quarter of the chroma of a pixel represented by spatial location P. The present pixel represented by spatial location F (i.e., present pixel F) originates from a present bottom field while the pixels at locations B and P originate from a top field one field phase later than the present bottom field. The pixels at B and P are spatially vertically adjacent to an absent pixel that corresponds to present pixel F. For execution stage field phase 1, the absent pixel chroma may be computed by way of the following equation:

$$\frac{1}{2}B + \frac{1}{4}E + \frac{1}{4}F,$$

as obtained from Table 2. The absent pixel chroma may be computed by summing one-half of the chroma represented by spatial location B, one-quarter of the chroma represented by spatial location E, and one-quarter of the chroma represented by spatial location F. Pixels at E and F are vertically adjacent to absent pixel O, as shown in FIG. 2. Pixel at location B spatially corresponds to pixel O; however the pixel at location B corresponds to a field that occurs one field phase later in time than the field corresponding to pixel O.

For execution stage field phase 2, the adjusted chroma from a present pixel from a corresponding present top field may be computed by way of solving the equation:

$$\frac{1}{2}E + \frac{1}{4}Q + \frac{1}{4}G,$$

obtained from Table 1. The adjusted chroma is computed by summing one-half of the chroma of a pixel represented by spatial location E, one-quarter of the chroma of a pixel represented by spatial location Q, and one-quarter of the chroma of a pixel represented by spatial location G. The present pixel represented by spatial location E (i.e., present pixel E) originates from a present top field while the pixels at locations Q and G originate from a bottom field one field phase earlier than the present top field. The pixels at Q and G are spatially vertically adjacent to an absent pixel that corresponds to present pixel E. Likewise, for execution stage field phase 2, the adjusted chroma from a present pixel from a corresponding present bottom field may be computed by way of solving the equation:

$$\frac{1}{2}F + \frac{1}{4}G + \frac{1}{4}R.$$

The adjusted chroma is computed by summing one-half of the chroma of a pixel represented by spatial location F, one-quarter of the chroma of a pixel represented by spatial location G, and one-quarter of the chroma of a pixel represented by spatial location R. The present pixel represented by spatial location F (i.e., present pixel F) originates from a present bottom field while the pixels at locations B and P originate from a top field one field phase earlier than the present bottom field. The pixels at G and R are spatially vertically adjacent to an absent pixel that corresponds to present pixel F. For execution stage field phase 1, the absent pixel chroma may be computed by way of the following equation:

$$\frac{1}{2}G + \frac{1}{4}E + \frac{1}{4}F,$$

as obtained from Table 2. The absent pixel chroma may be computed by summing one-half of the chroma represented by spatial location G, one-quarter of the chroma represented by spatial location E, and one-quarter of the chroma represented by spatial location F. Pixels at E and F are vertically adjacent to absent pixel O, as shown in FIG. 2. Pixel at location G spatially corresponds to pixel O; however location G corresponds to a field that occurs one field phase earlier in time than the field corresponding to pixel O.

For execution stage field phase 3, the adjusted chroma from a present pixel from a corresponding present top field may be computed by way of solving the equation:

$$\frac{1}{2}E + \frac{1}{2}C,$$

obtained from Table 1. As shown, the adjusted chroma is computed by taking the average of the chroma obtained from pixels E and C of the extended constellation shown in FIG. 2. For the bottom field, at execution stage field phase 3, the adjusted chroma may be computed by way of solving the equation:

$$\frac{1}{2}F + \frac{1}{2}D,$$

obtained from Table 1. As shown, the adjusted chroma is computed by taking the average of the chroma obtained from pixels F and D of the extended constellation shown in FIG. 2. For execution stage field phase 0, the absent pixel chroma may be computed by way of the following equation:

$$\frac{1}{4}C + \frac{1}{4}E + \frac{1}{4}D + \frac{1}{4}F,$$

as obtained from Table 2. Hence, one obtains the chroma for the absent pixel by taking the average of the chroma associated with pixels at spatial locations C, E, D, and F.

For execution stage field phase 4, the adjusted chroma from a present pixel from a corresponding present top field may be computed by solving the equation:

$$\frac{1}{4}N + \frac{1}{4}B + \frac{1}{4}Q + \frac{1}{4}G,$$

obtained from Table 1. As shown, the adjusted chroma is computed by taking the average of the chroma obtained from pixels N, B, Q, and G of the extended constellation shown in FIG. 2. Pixel locations N and B are spatially vertically adjacent to an absent pixel that corresponds to present pixel E while pixel locations Q and G are spatially vertically adjacent to an absent pixel that corresponds to present pixel E. Pixels N and B originate from a bottom field associated with a field phase that occurs one field phase later relative to the present top field. Pixels Q and G originate from a bottom field associated with a field phase that occurs one field phase earlier relative to the present top field. For execution stage field phase 4, the adjusted chroma field a present pixel from a corresponding present bottom field may be computed by way of solving the equation:

$$\frac{1}{4}B + \frac{1}{4}P + \frac{1}{4}G + \frac{1}{4}R,$$

obtained from Table 1. As shown, the adjusted chroma is computed by taking the average of the chroma obtained from pixels B, P, G, and R of the extended constellation shown in FIG. 2. Pixel locations B and P are spatially vertically adjacent to an absent pixel that corresponds to present pixel F while pixel locations G and R are spatially vertically adjacent to an absent pixel that corresponds to present pixel F. Pixels B and P originate from a top field associated with a field phase that occurs one field phase later relative to the present bottom field. Pixels G and R originate from a top field associated with a field phase that occurs one field phase earlier relative to the present bottom field. For execution stage field phase 4, the absent pixel chroma may be computed by way of the following equation:

$$\frac{1}{2}B + \frac{1}{2}G,$$

as obtained from Table 2. Hence, one obtains the chroma for the absent pixel by taking the average of the chroma obtained from corresponding pixels associated with spatial locations B and G.

Cross-chroma may be generated, for example, when video is modulated by a subcarrier and filtered through a comb filter. Given the alternating phase of a chroma subcarrier between subsequent fields (or output frames), localized features on the screen may result in alternating and opposite cross-chroma colors. Referring back to the equations presented in Tables 1 and 2, the adjusted chroma computed for present pixels in the top field or bottom field for execution stage field phases 0, 3, and 4 results in perfect cross-chroma cancellation because the terms used in the computation originate from two identical fields of the interlaced 3:2 pull-down video. These two identical fields may comprise two top fields or two bottom fields. Because there are an odd number of lines (e.g., 525 lines in NTSC formatted video) per output frame (e.g., progressive frame) and because of the way in which subcarrier modulation and demodulation of the video occurs (at 227.5 subcarrier periods per line), there is a 180 degree phase shift when the video is modulated or demodulated by the subcarrier frequency. As a consequence, the cross-chroma of successive fields or frames alternate in sign such that the cross-chroma between two identical top or bottom fields are exactly opposite of each other. As a result of this information, the various aspects of the invention perform an averaging of corresponding pixel chroma between the two identical top or bottom fields such that any cross-chroma perfectly cancels out.

Figure 3:
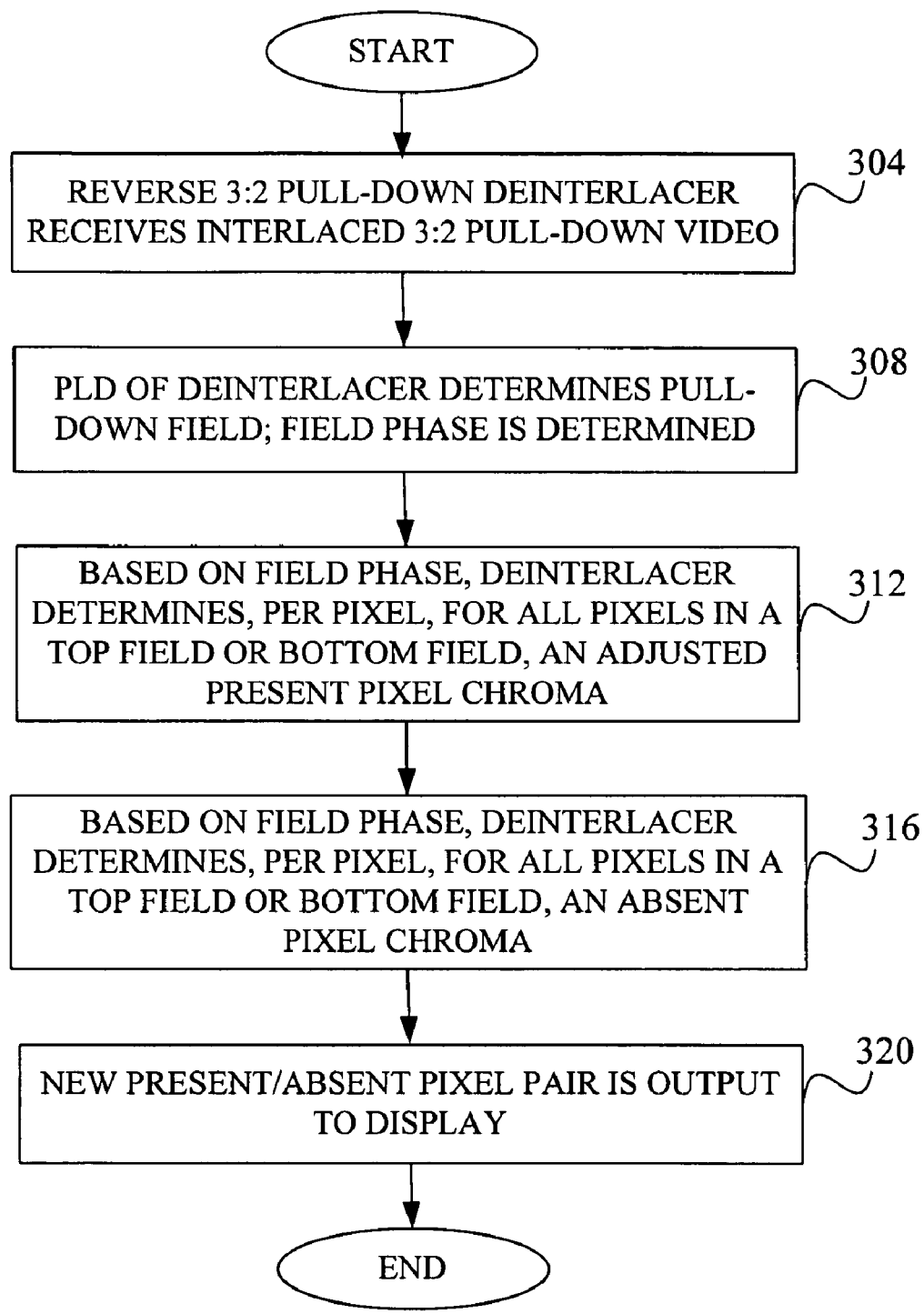
FIG. 3 is an operational flow diagram of a method used to reduce cross-chroma artifacts when deinterlacing pull-down video, in accordance with an embodiment of the invention.

FIG. 3 is an operational flow diagram of a method used to reduce cross-chroma artifacts when deinterlacing pull-down video, in accordance with an embodiment of the invention. In a preferred representative embodiment, the pull-down video corresponds to interlaced 3:2 pull-down video, which was previously illustrated in accordance with FIG. 1. At step 304, a reverse 3:2 pull-down deinterlacer receives the interlaced 3:2 pull-down video for processing. Next, at step 308, a phase lock detector (PLD) of the deinterlacer locates the pull-down field of the received 3:2 pull-down video. Details of the use and function of the PLD may be found in U.S. patent application Ser. No. 10/871,758 entitled "DETECTION AND PHASE LOCK OF PULL-DOWN VIDEO" filed on Jun. 17, 2004, the complete subject matter of which is incorporated herein by reference in its entirety. Next, at steps 312/316, based on the execution stage field phase, the deinterlacer determines adjusted chromas per top field and bottom field originated interlaced 3:2 video, using the equations previously described in Tables 1 and 2. Finally, at step 320, an adjusted present/absent pixel pair is output (i.e., as progressive video) to a display.

Figure 4:
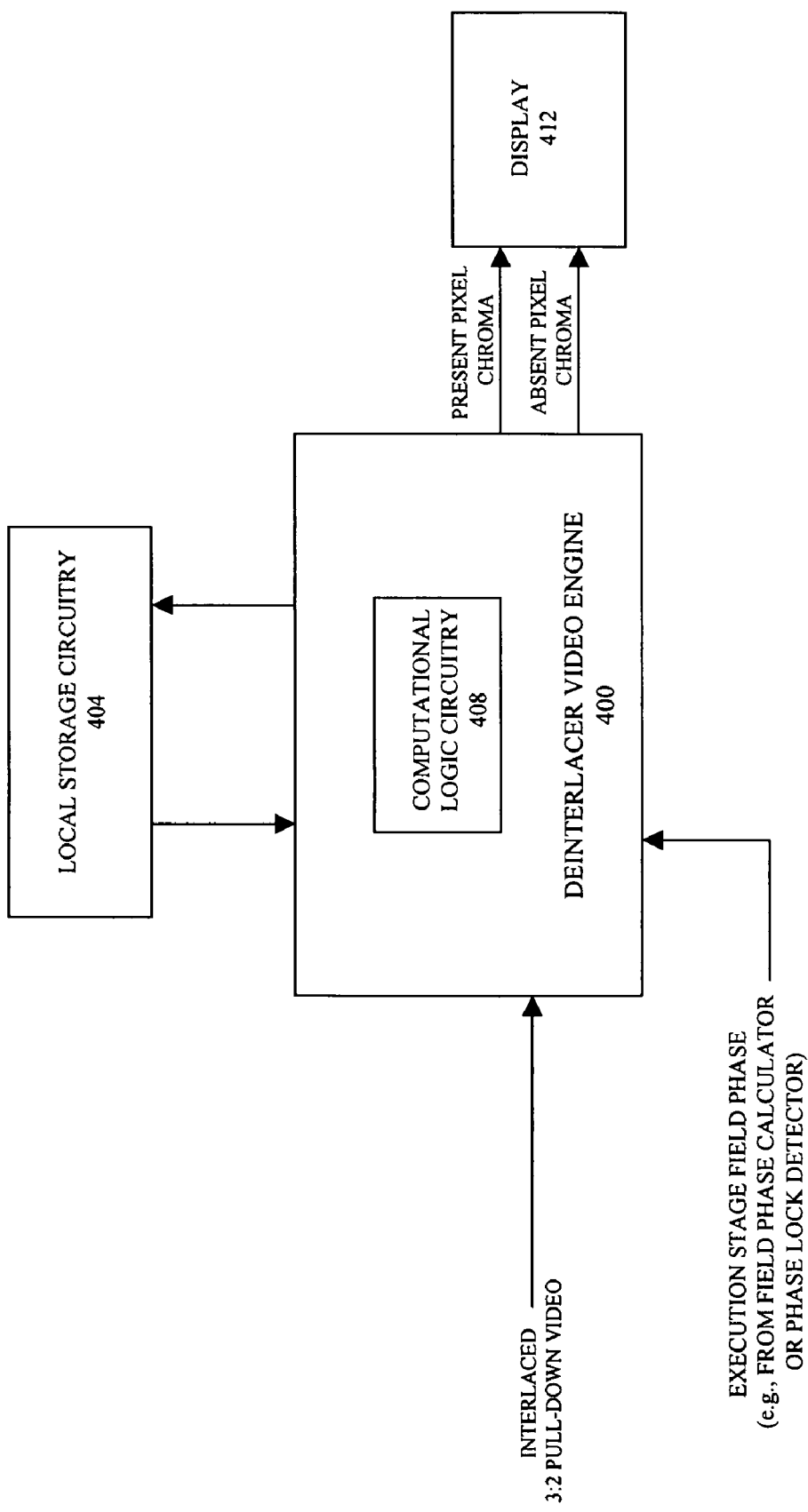
FIG. 4 is a functional block diagram of a system used to reduce cross-chroma artifacts when deinterlacing pull-down video, in accordance with an embodiment of the invention.

FIG. 4 is a functional block diagram of a system that is used to reduce cross-chroma artifacts when deinterlacing pull-down video, in accordance with an embodiment of the invention. The system comprises a deinterlacer video engine 400 and a local storage circuitry 404. The local storage circuitry 404 may comprise memory for storing values used in the one or more computations performed by the deinterlacer video engine 400. The memory may comprise random access memory, for example. The deinterlacer video engine 400 may store data into or retrieve data from the local storage circuitry 404. The deinterlacer video engine 400 may comprise computational logic circuitry 408 that performs the computations associated with the equations listed in Tables 1 and 2. The computational logic circuitry 408 may comprise any type of digital integrated circuit. The computation logic circuitry 408 may comprise a programmable logic device, for example. The deinterlacer video engine 400 receives a field phase input provided by a field phase calculator or phase lock detector (PLD). Details on the field phase calculator or PLD may be found in U.S. patent application Ser. No. 10/871,758 entitled "DETECTION AND PHASE LOCK OF PULL-DOWN VIDEO" filed on Jun. 17, 2004, the complete subject matter of which is incorporated herein by reference in its entirety. The deinterlacer video engine 400 processes interlaced 3:2 pull-down video to generate an adjusted present pixel chroma and absent pixel chroma. The adjusted present pixel chroma and absent pixel chroma are transmitted to a display 412.

In order to provide a reduced cost version of the implementation disclosed by the equations in Tables 1 and 2, the extended constellation of FIG. 2 may be modified by eliminating one or more pixel locations. By eliminating one or more of these pixel locations, the size of the local storage circuitry (discussed in reference to FIG. 4) may be reduced accordingly. For example, by eliminating or disregarding pixel locations R, T, and W (shown in the extended pixel constellation of FIG. 2), a reduced cost implementation of the equations in Tables 1 and 2 may be provided by Tables 3 and 4. The execution stage field phases are listed in the first column of Tables 3 and 4. The equations for computing the adjusted chromas are shown in the second and third columns of Table 3 while the equation for computing the absent pixel chroma is shown in the second column of Table 4.

TABLE 3

| Execution stage field phase | Present pixel chroma TOP FIELD | Present pixel chroma BOTTOM FIELD |
|---|---|---|
| 0 | $\frac{1}{2}E + \frac{1}{4}Q + \frac{1}{4}G$ | $\frac{1}{2}F + \frac{1}{2}G$ |
| 1 | $\frac{1}{2}E + \frac{1}{4}N + \frac{1}{4}B$ | $\frac{1}{2}F + \frac{1}{4}B + \frac{1}{4}P$ |
| 2 | $\frac{1}{2}E + \frac{1}{4}Q + \frac{1}{4}G$ | $\frac{1}{2}F + \frac{1}{2}G$ |
| 3 | $\frac{1}{2}E + \frac{1}{2}C$ | $\frac{1}{2}F + \frac{1}{2}D$ |
| 4 | $\frac{1}{4}N + \frac{1}{4}B + \frac{1}{4}Q + \frac{1}{4}G$ | $\frac{1}{4}B + \frac{1}{4}P + \frac{1}{2}G$ |

TABLE 4

| Execution stage field phase | Absent pixel chroma |
|---|---|
| 0 | $\frac{1}{2}G + \frac{1}{4}E + \frac{1}{4}F$ |
| 1 | $\frac{1}{2}B + \frac{1}{4}E + \frac{1}{4}F$ |
| 2 | $\frac{1}{2}G + \frac{1}{4}E + \frac{1}{4}F$ |
| 3 | $\frac{1}{4}C + \frac{1}{4}D + \frac{1}{4}E + \frac{1}{4}F$ |
| 4 | $\frac{1}{2}B + \frac{1}{2}G$ |

In the representative embodiment, provided by Tables 3 and 4, two out of five field phases (i.e., execution stage field phase 3 and 4) provide perfect cross-chroma cancellation for present top field originated frames. However, for bottom field originated frames, cross-chroma is completely cancelled for execution stage field phase 3 while cross-chroma is mostly cancelled for execution stage field phase 4. For execution stage field phases 0, 1, and 2, perfect or complete cancellation is not possible in this "reduced cost" embodiment. For execution field phases 0, 1, and 2, the adjusted chroma is obtained by averaging chroma from top and bottom fields sourced from an originating source film frame. With respect to Table 4, the equations are the same as that for Table 2 except for the equation corresponding to execution stage field phase 0. For this equation, the chroma from G is used to replace the chroma obtained from pixel locations T and W. Although not described, it is contemplated that other variations of extended pixel constellations may be used in generating adjusted chroma for present pixels and absent pixels when deinterlacing pull-down video.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of outputting chroma from a pull-down video deinterlacer, said chroma having reduced cross-chroma artifacts, said method comprising:
   first computing an adjusted chroma of a present pixel for a present top field of film sourced video and a present bottom field of said film sourced video, said adjusted chroma computed as a function of an execution stage field phase of said pull-down video deinterlacer; and
   second computing a chroma of an absent pixel vertically adjacent to said present pixel, said second computing performed as a function of said execution stage field phase.

2. The method of claim 1 wherein said first computing an adjusted chroma is performed by averaging the chroma of pixels obtained from fields originating from the same source film frame.

3. The method of claim 1 wherein said film sourced video corresponds to interlaced 3:2 pull-down video and said pull-down video deinterlacer comprises a reverse 3:2 pull-down deinterlacer.

4. The method of claim 3 wherein said first computing said adjusted chroma is performed by averaging the chroma of said present pixel and its corresponding pixel chroma output two field phases earlier in time, said averaging performed if said execution stage field phase corresponds to a field phase of said pull-down field.

5. The method of claim 3 wherein said chroma of said absent pixel is computed by averaging four chroma associated with each of four pixels.

6. The method of claim 5 wherein said four pixels corresponds to a first pair of vertically adjacent present pixels relative to said absent pixel, and a second pair of pixels that are spatially identical to said first pair of vertically adjacent present pixels, said second pair of pixels output two field phases earlier in time relative to said present top field or said present bottom field, said averaging performed if said execution stage field phase corresponds to a field phase of said pull-down field.

7. The method of claim 3 wherein said first computing said adjusted chroma of said present pixel from a present top field is performed by summing one-half of the chroma of said present pixel from said present top field and one-quarter each of the chroma from two pixels from a bottom field, said two pixels vertically adjacent relative to a spatial location corresponding to said present pixel from said present top field, said bottom field occurring one field phase later in time relative to said present top field, said summing performed if said execution stage field phase corresponds to one field phase following a field phase of said pull-down field.

8. The method of claim 3 wherein said first computing said adjusted chroma of said present pixel from a present bottom field is performed by summing one-half of said chroma of said present pixel from said present bottom field and one-quarter each of the chroma from two pixels from a top field, said two pixels vertically adjacent relative to a spatial location corresponding to said present pixel from said present bottom field, said top field occurring one field phase later in time relative to said present bottom field, said summing performed if said execution stage field phase corresponds to one field phase following a field phase of said pull-down field.

9. The method of claim 3 wherein said second computing said chroma of said absent pixel is performed by summing one-quarter of a first and second chroma obtained from each of two vertically adjacent present pixels relative to said absent pixel, and one-half of a third chroma obtained from a third pixel in a top or bottom field, said top or bottom field occurring one field phase later relative to said present top or bottom field, said third pixel spatially identical to said absent pixel, said summing performed if said execution stage field phase corresponds to one field phase following a field phase of said pull-down field.

10. The method of claim 3 wherein said first computing said adjusted chroma of said present pixel from said present top field is performed by summing one-half of the chroma of said present pixel from said present top field and one-quarter each of the chroma from two pixels in a bottom field, said two pixels vertically adjacent relative to a spatial location corresponding to said present pixel from said present top field, said bottom field occurring one field phase earlier in time relative to said present top field, said summing performed if said execution stage field phase corresponds to two field phases following a field phase of said pull-down field.

11. The method of claim 3 wherein said first computing said adjusted chroma of said present pixel from said present bottom field is performed by summing one-half of the chroma of said present pixel from said present bottom field and one-quarter each of the chroma from two pixels in a top field, said two pixels vertically adjacent relative to a spatial location corresponding to said present pixel from said present bottom field, said top field occurring one field phase earlier in time, said summing performed if said execution stage field phase corresponds to two field phases following a field phase of said pull-down field.

12. The method of claim 3 wherein said second computing said chroma of said absent pixel is performed by summing one-quarter of the chroma obtained from each of two vertically adjacent present pixels relative to said absent pixel, and a third chroma obtained from a spatial location in a top or bottom field, said spatial location corresponding to said absent pixel, said top or bottom field occurring one field phase earlier relative to said present top or bottom field, said summing performed if said execution stage field phase corresponds to two field phases following a field phase of said pull-down field.

13. The method of claim 3 wherein said first computing said adjusted chroma is performed by averaging the chroma of said present pixel and its corresponding pixel chroma output two field phases later in time, said averaging performed if said execution stage field phase corresponds to three field phases following a field phase of said pull-down field.

14. The method of claim 2 wherein said chroma of said absent pixel is computed by averaging four chroma associated with each of four pixels.

15. The method of claim 14 wherein said four pixels corresponds to a first pair of vertically adjacent present pixels relative to said absent pixel, and a second pair of pixels that are spatially identical to said first pair of vertically adjacent present pixels, said second pair of pixels output two field phases later in time relative to said present top field or said present bottom field, said averaging performed if said execution stage field phase corresponds to three field phases following a field phase of said pull-down field.

16. The method of claim 3 wherein said first computing said adjusted chroma of said present top field is performed by averaging chroma from four pixels, said four pixels comprising:
  a first pair of said four pixels originating from a first bottom field relative to said present pixel from said present top field, said first pair vertically adjacent relative to a spatial location corresponding to said present pixel from said present top field, said first bottom field occurring one field phase later in time relative to said present top field; and
  a second pair of said four pixels originating from a second bottom field relative to said present pixel from said present top field, said second pair vertically adjacent relative to a spatial location corresponding to said present pixel from said present top field, said second bottom field occurring one field phase earlier in time relative to said present top field, said averaging performed if said execution stage field phase corresponds to four field phases following a field phase of said pull-down field.

17. The method of claim 3 wherein said first computing said adjusted chroma of said present bottom field is performed by averaging chroma from four pixels, said four pixels comprising:
- a first pair of said four pixels originating from a first top field relative to said present pixel from said present bottom field, said first pair vertically adjacent relative to a spatial location corresponding to said present pixel from said present bottom field, said first top field occurring one field phase later in time relative to said present bottom field; and
- a second pair of said four pixels originating from a second top field relative to said present pixel from said present bottom field, said second pair vertically adjacent relative to a spatial location corresponding to said present pixel from said present bottom field, said second top field occurring one field phase earlier in time relative to said present bottom field, said averaging performed if said execution stage field phase corresponds to four field phases following a field phase of said pull-down field.

18. The method of claim 3 wherein said chroma of said absent pixel is computed by averaging chroma from two pixels, said two pixels spatially identical to said absent pixel, wherein said two pixels originate from either a top or bottom field, the first pixel of said two pixels originating from a field occurring one field phase earlier in time relative to said absent pixel, the second pixel of said two pixels originating from a field occurring one field phase later in time relative to said absent pixel, said averaging performed if said execution stage field phase corresponds to four field phases following a field phase of said pull-down field.

19. A system for deinterlacing interlaced 3:2 pull-down video and outputting chroma having reduced cross-chroma artifacts, said system comprising:
- a deinterlacer video engine capable of receiving said interlaced 3:2 pull-down video, said deinterlacer video engine first computing an adjusted chroma of a present pixel for a present top field of film sourced video and a present bottom field of said film sourced video, said adjusted chroma computed as a function of an execution stage field phase of said 3:2 pull-down video deinterlacer, said deinterlacer video engine second computing a chroma of an absent pixel vertically adjacent to said present pixel, said second computing performed as a function of said execution stage field phase.

20. The system of claim 19 wherein said first computing said adjusted chroma is performed by averaging the chroma of pixels obtained from fields originating from the same source film frame.

21. The system of claim 19 wherein said deinterlacer video engine comprises a computational logic circuitry for performing said first computing and said second computing.

22. The system of claim 19 further comprising a local storage circuitry for storing one or more values used for performing said first computing and said second computing.

23. The system of claim 19 wherein said adjusted chroma of said present pixel and said chroma of said absent pixel is output from said deinterlacer video engine and transmitted to a display.

* * * * *